(12) United States Patent
Kanazawa et al.

(10) Patent No.: US 10,723,042 B2
(45) Date of Patent: Jul. 28, 2020

(54) SAW WIRE AND CUTTING APPARATUS

(71) Applicant: PANASONIC INTELLECTUAL PROPERTY MANAGEMENT CO., LTD., Osaka (JP)

(72) Inventors: Tomohiro Kanazawa, Osaka (JP); Tetsuji Shibata, Osaka (JP); Kazushige Sugita, Hyogo (JP); Hiroshi Gouda, Osaka (JP); Naoki Kohyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 188 days.

(21) Appl. No.: 15/905,376

(22) Filed: Feb. 26, 2018

(65) Prior Publication Data

US 2018/0281231 A1 Oct. 4, 2018

(30) Foreign Application Priority Data

Mar. 30, 2017 (JP) ................................. 2017-068965

(51) Int. Cl.
*B23D 61/18* (2006.01)
*B28D 5/04* (2006.01)
(Continued)

(52) U.S. Cl.
CPC ............... *B28D 5/045* (2013.01); *B22F 5/12* (2013.01); *B23D 61/18* (2013.01); *B23D 61/185* (2013.01);
(Continued)

(58) Field of Classification Search
CPC .......... B28D 1/08; B28D 5/042; B28D 5/045; B22F 5/12; B23D 61/18; B23D 61/185;
(Continued)

(56) References Cited

U.S. PATENT DOCUMENTS 3,503,108 A * 3/1970 Besha .................... B23D 65/00
407/30
4,015,931 A * 4/1977 Thakur ................ B23D 61/185
125/21
(Continued)

FOREIGN PATENT DOCUMENTS

GB 1435250 A * 5/1976 .......... B23D 61/185
JP 51-35189 A 3/1976
(Continued)

OTHER PUBLICATIONS

"Luma Tungsten Wire alloyed with 3% Rhenium," Luma Metall. Mar. 2014 (https://luma-metall.com/wp-content/uploads/2017/01/Luma-Tungstenalloyed-with-rhenium_march2014) p. 1-2.
(Continued)

*Primary Examiner* — Eileen P Morgan
(74) *Attorney, Agent, or Firm* — McDermott Will & Emery LLP

(57) ABSTRACT

A saw wire includes a metal wire containing rhenium-tungsten alloy. A rhenium content of the metal wire is at least 0.1 wt % and at most 10 wt % with respect to a total weight of rhenium and tungsten, an elastic modulus of the metal wire is at least 350 GPa and at most 450 GPa, a tensile strength of the metal wire is at least 3500 MPa, and a diameter of the metal wire is at most 60 μm.

12 Claims, 3 Drawing Sheets

(51) Int. Cl.
*B23D 57/00* (2006.01)
*B28D 5/00* (2006.01)
*B22F 5/12* (2006.01)
*C22C 1/04* (2006.01)
*B23D 65/00* (2006.01)
*C22F 1/18* (2006.01)

(52) U.S. Cl.
CPC ........... *B28D 5/007* (2013.01); *B28D 5/0076* (2013.01); *B23D 65/00* (2013.01); *C22C 1/045* (2013.01); *C22F 1/18* (2013.01)

(58) Field of Classification Search
CPC .. B23D 57/00; B23D 57/003; B23D 57/0007; B23D 57/0023; B23D 57/0069
USPC ..................................... 125/16.01, 16.02, 21
See application file for complete search history.

(56) References Cited

U.S. PATENT DOCUMENTS

| | | | | |
|---|---|---|---|---|
| 4,055,700 | A * | 10/1977 | Ronnquist | B23D 61/185 428/366 |
| 4,139,659 | A * | 2/1979 | Ronnquist | B23D 61/185 427/249.15 |
| 5,519,938 | A * | 5/1996 | Kojima | H01L 21/4878 29/890.03 |
| 5,715,806 | A * | 2/1998 | Tonegawa | B28D 5/0058 125/1 |
| 6,065,462 | A * | 5/2000 | Hodsden | B23D 61/185 125/21 |
| 6,915,796 | B2 * | 7/2005 | Sung | B23D 61/185 125/12 |
| 2004/0244879 | A1 * | 12/2004 | Tanaka | B21C 1/003 148/514 |
| 2005/0183713 | A1 * | 8/2005 | Takeuchi | B28D 5/045 125/21 |
| 2007/0224100 | A1 * | 9/2007 | Kaner | B23B 27/148 423/276 |
| 2008/0261499 | A1 * | 10/2008 | Tani | B23D 61/185 451/528 |
| 2011/0009039 | A1 * | 1/2011 | Balagani | B23D 61/185 451/533 |
| 2011/0100347 | A1 * | 5/2011 | Branagan | B23D 61/185 125/21 |
| 2012/0017741 | A1 * | 1/2012 | Lange | B23D 61/185 83/651.1 |
| 2013/0061535 | A1 * | 3/2013 | Tian | B23D 61/185 51/309 |
| 2013/0206126 | A1 * | 8/2013 | Pietsch | B28D 5/007 125/21 |
| 2014/0011434 | A1 * | 1/2014 | Puzemis | B23D 61/185 451/537 |
| 2014/0013675 | A1 * | 1/2014 | Tian | B24D 3/007 51/309 |
| 2014/0017984 | A1 * | 1/2014 | Rehrig | B23D 61/185 451/529 |
| 2014/0017985 | A1 * | 1/2014 | Tian | B23D 61/185 451/533 |
| 2014/0150766 | A1 * | 6/2014 | Che | B24B 27/0633 125/16.02 |
| 2014/0311472 | A1 * | 10/2014 | Tian | B23D 65/00 125/21 |
| 2015/0040884 | A1 * | 2/2015 | Ueda | B24B 27/0633 125/21 |
| 2015/0083104 | A1 * | 3/2015 | Pietsch | B23D 57/0023 125/21 |
| 2015/0314484 | A1 * | 11/2015 | Pietsch | B23D 57/0053 125/21 |
| 2016/0082533 | A1 * | 3/2016 | Ly | B23D 61/185 125/21 |
| 2016/0121413 | A1 * | 5/2016 | Ly | B23D 61/185 125/21 |
| 2016/0375514 | A1 * | 12/2016 | Tian | B28D 5/045 51/309 |
| 2018/0326517 | A1 * | 11/2018 | Kanazawa | B23D 61/185 |
| 2018/0326519 | A1 * | 11/2018 | Kanazawa | B23D 65/00 |
| 2019/0232404 | A1 * | 8/2019 | Kanazawa | B23D 61/185 |

FOREIGN PATENT DOCUMENTS

| | | | |
|---|---|---|---|
| JP | 2000-119837 A | | 4/2000 |
| JP | 2008-213111 A | | 9/2008 |
| JP | 2010-089173 A | | 4/2010 |
| JP | 2018167390 A | * | 11/2018 |

OTHER PUBLICATIONS

Taiwanese Office Action issued in Application No. 107106461 dated Aug. 1, 2018, with partial English translation.
"Luma Tungsten Wire alloyed with 3% Rhenium," Luma Metall. Mar. 2014 (https://luma-metall.com/wp-content/uploads/2017/01/LUMA-Tungsten-alloyed-with-rhenium_march2014.pdf) p. 1-2.
Taiwanese Office Action issued in Appiication No. 107106461 dated Aug. 1, 2018, with partial English translation.

* cited by examiner

SAW WIRE AND CUTTING APPARATUS

CROSS REFERENCE TO RELATED APPLICATION

This application claims the benefit of priority of Japanese Patent Application Number 2017-068965 filed on Mar. 30, 2017, the entire content of which is hereby incorporated by reference.

BACKGROUND

1. Technical Field

The present disclosure relates to a saw wire and a cutting apparatus including the saw wire.

2. Description of the Related Art

Conventionally, a multi-wire saw for slicing a silicon ingot using wires composed of piano wire has been known (see reference, for example, to Japanese Unexamined Patent Application Publication No. 2008-213111).

SUMMARY

During the slicing operation of a wire saw, swarf is produced in an amount approximately corresponding to the wire diameter. The aforementioned multi-wire saw uses wires composed of piano wire, however, it is difficult to reduce the diameter size of piano wire. It is thus difficult, in the present conditions, to manufacture piano wire having a diameter less than 60 µm. In addition, since piano wire has an elastic modulus of at least 150 GPa and at most 250 GPa, even if the piano wire could be thinned, deflection still occurs during the slicing process. Therefore, thinned piano wires are unfit for use in wire-saw slicing.

In view of the above, the present disclosure has an object to provide: a saw wire that is thinner than piano wire, and has an elastic modulus approximately twice as high as that of the piano wire as well as a tensile strength equal to or higher than that of the piano wire; and a cutting apparatus including the saw wire.

In order to achieve the above object, a saw wire according to the present disclosure is a saw wire that includes a metal wire containing rhenium-tungsten (ReW) alloy. A rhenium content of the metal wire is at least 0.1 wt % and at most 10 wt % with respect to a total weight of rhenium (Re) and tungsten (W), an elastic modulus of the metal wire is at least 350 GPa and at most 450 GPa, a tensile strength of the metal wire is at least 3500 MPa, and a diameter of the metal wire is at most 60 µm.

In addition, a saw wire according to one aspect of the present disclosure is a saw wire that includes a metal wire containing potassium (K)-doped tungsten. A potassium content of the metal wire is at least 0.005 wt % and at most 0.010 wt % with respect to a total weight of potassium (K) and tungsten (W), an elastic modulus of the metal wire is at least 350 GPa and at most 450 GPa, a tensile strength of the metal wire is at least 3500 MPa, and a diameter of the metal wire is at most 60 µm.

Moreover, a cutting apparatus according to one aspect of the present disclosure includes the saw wire as described above.

According to the present disclosure, it is possible to provide: a saw wire that is thinner than piano wire, and has an elastic modulus approximately twice as high as that of the piano wire as well as a tensile strength equal to or higher than that of the piano wire; and a cutting apparatus including the saw wire.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, the saw wire and cutting apparatus according to the exemplary embodiment of the present disclosure will be described with reference to the drawings. Note that the subsequently-described exemplary embodiment shows a specific example of the present disclosure. Accordingly, the numerical values, structural components, the arrangement and connection of the components as well as steps and the sequence of the steps, etc. shown in the following embodiments are mere examples, and are not intended to limit the scope of the present disclosure. Therefore, among the structural components in the following exemplary embodiment, components not recited in any one of the independent claims which indicate the broadest concepts of the present disclosure are described as arbitrary structural components.

Moreover, the respective figures are schematic diagrams and are not necessarily precise illustrations. Therefore, the scale sizes in the figures, for example, are not necessarily the same. In addition, in the respective figures, substantially identical components are assigned the same reference signs, and overlapping description is omitted or simplified.

Furthermore, a term, such as "parallel" or "equal", representing a relationship between the components as well as a term, such as "circular", representing a form, and a numerical range are used in the present description. Such terms and range are each not representing only a strict meaning of the term or range, but implying that a substantially same range, e.g., a range that includes even a difference as small as a few percentage points, is connoted in the term or range.

Embodiment

[Cutting Apparatus]

Figure 1:
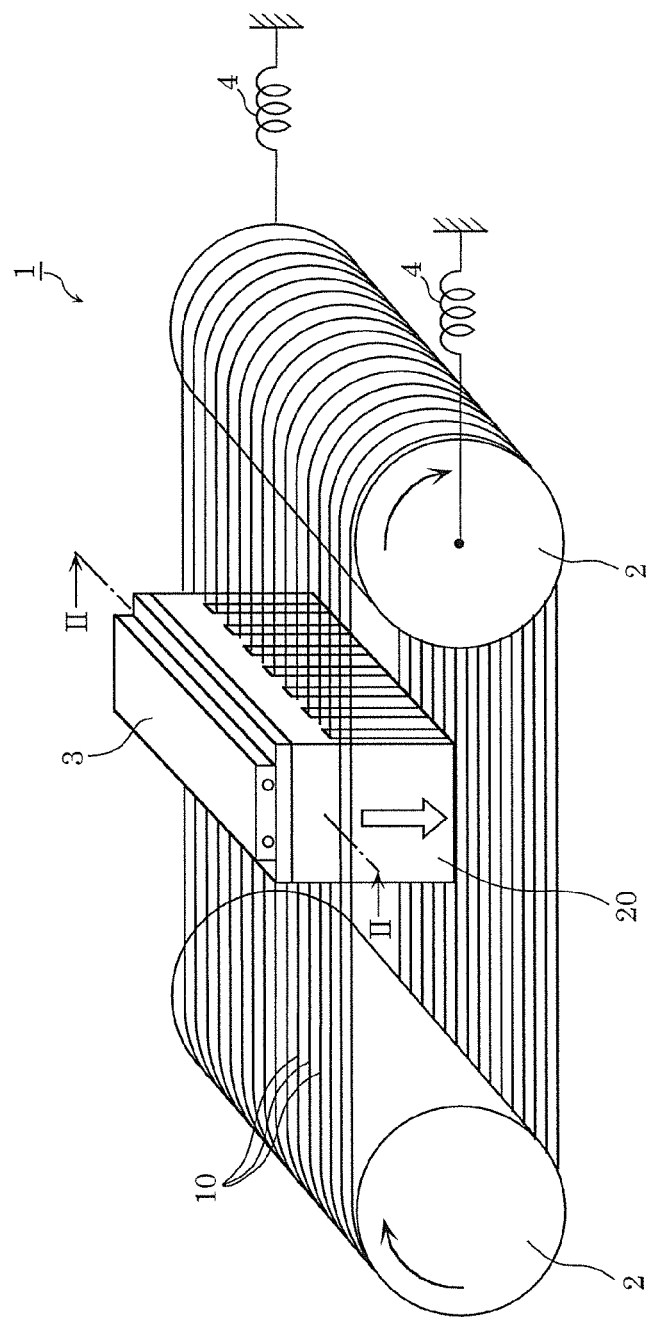
FIG. 1 is a perspective illustration of a cutting apparatus according to an exemplary embodiment of the present disclosure.

First, the outline of a cutting apparatus that includes the saw wire according to the present exemplary embodiment will be described with reference to FIG. 1. FIG. 1 is a perspective illustration of the cutting apparatus according to the present exemplary embodiment.

As illustrated in FIG. 1, cutting apparatus 1 is a multi-wire saw including saw wire 10. Cutting apparatus 1 produces wafers by, for example, cutting ingot 20 into thin slices. Ingot 20 is, for instance, a silicon ingot made of single-crystal silicon. More specifically, cutting apparatus 1 simultaneously produces silicon wafers by slicing ingot 20 using saw wire 10.

Note that ingot 20 is a silicon ingot but is not limited to such. For example, an ingot made of other substance such as silicon carbide or sapphire may be used. Alternatively, an object to be cut by cutting apparatus 1 may be concrete, glass, etc.

As illustrated in FIG. 1, cutting apparatus 1 further includes two guide rollers 2, ingot holder 3, and tension releasing device 4.

Saw wires 10 are looped multiple times over two guide rollers 2. Here, it is described, for convenience of explanation, that saw wire 10 corresponding to one loop is regarded as one saw wire 10 and plural saw wires 10 are looped over two guide rollers. Stated differently, plural saw wires 10 form a single saw wire. Note that plural saw wires 10 may be a plurality of saw wires that are separate from one another. Each of guide rollers 2 rotates in the state where saw wire 10 is straightly tightened with a predetermined tension, and thereby causes saw wires 10 to rotate at a predetermined speed. Saw wires 10 are disposed in parallel to one another and are equally spaced. More specifically, each guide roller 2 defines circumferential grooves positioned at predetermined intervals for saw wires 10 to fit in. The intervals between the grooves are determined according to the thickness of the wafers desired to be sliced off. The width of the groove is substantially the same as diameter φ of saw wire 10.

Note that cutting apparatus 1 may include three or more guide rollers 2. Saw wires 10 may be looped over these guide rollers 2.

Ingot holder 3 holds ingot 20 which is an object to be cut. Ingot holder 3 pushes ingot 20 through saw wires 10, and thereby ingot 20 is sliced by saw wires 10.

Tension releasing device 4 is a device that releases tension exerted on saw wire 10. Tension releasing device 4 is, for example, an elastic body such as a coiled or plate spring. As illustrated in FIG. 1, tension releasing device 4, e.g., a coiled spring has one end connected to guide roller 2 and the other end fixed to a predetermined wall surface. Tension releasing device 4 is capable of releasing the tension exerted on saw wire 10, by adjusting the position of guide roller 2.

Note that cutting apparatus 1 may employ a free abrasive method and include a feeder that feeds slurry to saw wires 10, although not shown in the diagram. The slurry is made by dispersing abrasive particles into a cutting fluid such as a coolant. The abrasive particles included in the slurry attach to saw wires 10, and thereby the slicing of ingot 20 can be carried out easily.

Figure 2:
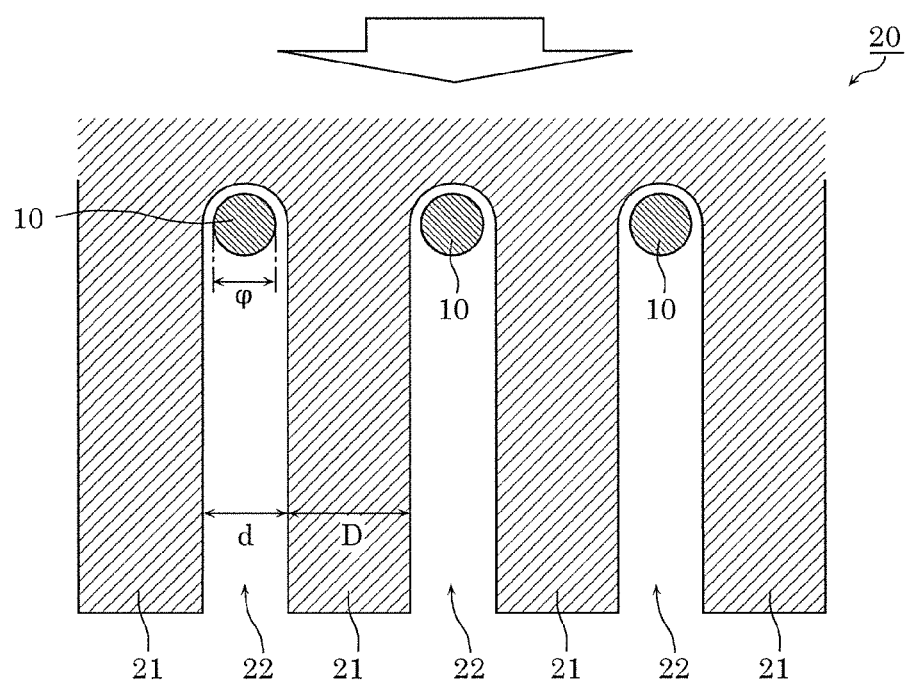
FIG. 2 is a cross-section view illustrating how an ingot is sliced by the cutting apparatus according to the exemplary embodiment of the present disclosure.

FIG. 2 is a cross-sectional view illustrating how ingot 20 is sliced by cutting apparatus 1 according to the present exemplary embodiment. FIG. 2 illustrates a cross section that is taken along the line II-II illustrated in FIG. 1 and that is orthogonal to the extending direction of saw wire 10. More specifically, FIG. 2 illustrates how three saw wires 10 among saw wires 10 slice ingot 20.

By pushing ingot 20 through saw wires 10, ingot 20 is divided into partly-sliced portions 21 by saw wires 10. Space 22 between neighboring partly-sliced portions 21 is a space made by ingot 20 being scraped off by saw wire 10. In other words, the size of space 22 is equivalent to a kerf loss of ingot 20.

Width d of space 22 depends on diameter φ of saw wire 10. Stated differently, width d increases as diameter φ of saw wire 10 becomes larger, and thereby, the kerf loss of ingot 20 increases. Width d decreases as diameter φ of saw wire 10 becomes smaller, and thereby, the kerf loss of ingot 20 decreases.

More specifically, width d of space 22 becomes greater than diameter φ. The difference between width d and diameter φ depends on the size of the abrasive particles that attach to saw wire 10 and the oscillation width of the vibrations caused when saw wire 10 rotates around guide rollers 2. Here, the oscillation width of saw wire 10 can be reduced by tightly tensioning saw wire 10. The higher the tensile strength and elastic modulus of saw wire 10 become, it becomes possible to tightly tension saw wire 10. Thus, the oscillation width of saw wire 10 is reduced and thereby width d of space 22 can be reduced. As a result, it is possible to further reduce the kerf loss of ingot 20.

Note that thickness D of partly-sliced portion 21 depends on the intervals at which saw wires 10 are disposed. Accordingly, wire saws 10 are disposed at intervals each resulting from adding desired thickness D and a predetermined margin. More specifically, a margin is a difference between width d and diameter φ, and is a value determined in accordance with the oscillation width of saw wire 10 and the grain diameter of the abrasive particle attached to saw wire 10.

Based on what has been described above, diameter φ, tensile strength, and elastic modulus of saw wire 10 are significant parameters in order to reduce the kerf loss of ingot 20. More specifically, by decreasing diameter φ of saw wire 10 or increasing the tensile strength and elastic modulus of saw wire 10, the kerf loss of ingot 20 can be reduced. Saw wire 10 according to the present exemplary embodiment has diameter φ smaller than that of piano wire generally having a diameter of approximately 80 μm, and has a tensile strength equal to or higher than that of piano wire generally having a tensile strength of at least 3500 MPa.

Hereinafter, the structure and manufacturing method of saw wire 10 will be described.

[Saw Wire]

Saw wire 10 according to the present exemplary embodiment includes a metal wire containing rhenium-tungsten (ReW) alloy. Saw wire 10 is quite simply a metal wire in the present exemplary embodiment.

Saw wire 10 contains tungsten as a major component, and a predetermined proportion of rhenium. The rhenium content of saw wire 10 is at least 0.1 wt % and at most 10 wt %. For example, the rhenium content may be at least 0.5 wt % and at most 5 wt %. Although the rhenium content is 3 wt %, as an example, it may be 1 wt %. By increasing the rhenium content, the tensile strength of saw wire 10 becomes higher. However, in the case where the rhenium content is too high, it becomes difficult to reduce the diameter size of saw wire 10.

The tensile strength of the metal wire containing ReW alloy increases as diameter φ becomes smaller. Stated differently, with the use of the metal wire containing ReW alloy, it is possible to realize saw wire 10 having small diameter φ and a high tensile strength, and thereby to reduce the kerf loss of ingot 20.

To be more specific, the tensile strength of saw wire 10 is at least 3500 MPa. The tensile strength of saw wire 10 is, for example, at least 3500 MPa and at most 5000 MPa, but is not limited to such. For example, the tensile strength of saw wire 10 may be at least 4000 MPa.

In addition, the elastic modulus of saw wire 10 is at least 350 GPa and at most 450 GPa. Note that the elastic modulus is longitudinal elastic modulus. In other words, saw wire 10 has an elastic modulus approximately twice as high as that of piano wire.

Diameter φ of saw wire 10 is at most 60 μm. For example, diameter φ of saw wire 10 may be at least 40 μm or at least 30 μm. More specifically, diameter φ of saw wire 10 is 20 μm, but may be 10 μm. Note that in the case of attaching diamond particles to saw wire 10, diameter φ of saw wire 10 may be, for example, at least 10 μm. Diameter φ of saw wire 10 is uniform. Note that diameter φ of saw wire 10 may not be entirely uniform and the size of diameter φ may slightly differ by approximately a few percentage points, e.g., 1%, depending on the portion of saw wire 10. Since diameter φ of saw wire 10 is at most 60 μm, saw wire 10 has elasticity and thus can be bent easily to a satisfactory extent. Therefore, it is possible to easily loop saw wire 10 over and across guide rollers 2.

Saw wire 10 is, for instance, a metal wire whose shape of the cross-section taken along the line orthogonal to the extending direction of the wire is circular, but the shape is not limited to such. The cross-sectional shape of saw wire 10 may be rectangular such as square, or oval, or other shape.

[Method of Manufacturing Saw Wire]

Figure 3:
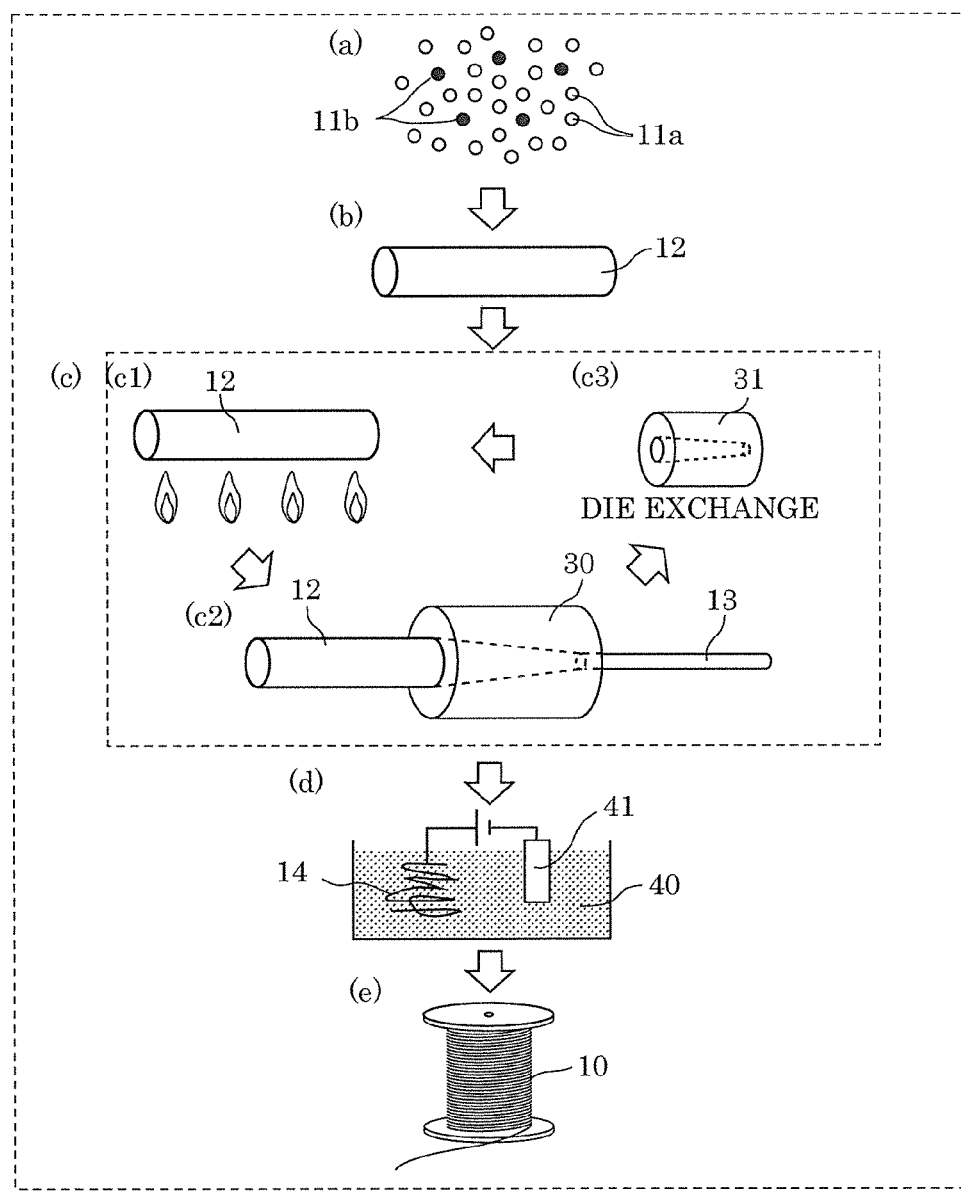
FIG. 3 is a state transition diagram illustrating a method of manufacturing a saw wire according to the exemplary embodiment of the present disclosure.

Hereinafter, a manufacturing method of saw wire 10 having the above-described features will be described with reference to FIG. 3. FIG. 3 is a state transition diagram illustrating the method of manufacturing saw wire 10 according to the present exemplary embodiment.

First, predetermined portions of tungsten powder 11a and rhenium powder 11b are prepared, as illustrated in (a) in FIG. 3. More specifically, rhenium powder 11b is prepared in the range from 0.1% to 10% of the total weight of tungsten powder 11a and rhenium powder 11b, and the rest is defined to be tungsten powder 11a. Average grain diameter of tungsten powder 11a and rhenium powder 11b, respectively, is 5 μm, for example, but is not limited to such.

Next, by pressing and sintering a mixture of tungsten powder 11a and rhenium powder 11b, a ReW ingot containing rhenium-tungsten alloy is produced. By performing, onto the ReW ingot, a swaging processing of extending an ingot by press-forging the ingot from its periphery, wire-like ReW filament 12 is produced, as illustrated in (b) in FIG. 3. For example, wire-like ReW filament 12 has a diameter of approximately 3 mm whereas the ReW ingot being a sintered body has a diameter of approximately 15 mm.

Next, a drawing processing using wire drawing dies is carried out, as illustrated in (c) in FIG. 3.

To be specific, firstly, ReW filament 12 is annealed, as illustrated in (c1) in FIG. 3. More precisely, ReW filament 12 is heated not only directly with a burner, but is heated also by applying electrical current to ReW filament 12. The annealing process is performed in order to eliminate processing distortion generated in the swaging or drawing processing.

Next, drawing of ReW filament 12 using wire drawing die 30, i.e., a wire drawing process, is performed, as illustrated in (c2) in FIG. 3. Note that since ReW filament 12 is rendered ductile after having being heated in the previous step of annealing process, wire drawing can be easily carried out. By reducing the diameter size of ReW filament 12, the tensile strength of ReW filament 12 becomes higher. In other words, ReW filament 13 whose diameter size is reduced in the wire drawing process has a tensile strength higher than that of ReW filament 12. Note that the diameter of ReW filament 13 is, for example, 0.6 mm, but is not limited to such.

Next, die exchange is performed, as illustrated in (c3) in FIG. 3. More specifically, wire drawing die 31 with a pore diameter smaller than that of wire drawing die 30 is selected as a die to be used in the next drawing processing. Note that wire drawing dies 30 and 31 are, for example, diamond dies containing sintered diamond, single-crystal diamond, or the like.

The processes from (c1) to (c3) illustrated in FIG. 3 are repeated until ReW filament 13 is thinned down to have desired diameter φ (specifically, 60 μm at most). Here, the drawing process illustrated in (c2) in FIG. 3 is performed by adjusting the form as well as hardness of wire drawing die 30 or 31, a lubricant to be used, and the temperature of ReW filament, in accordance with the diameter of a ReW filament to be processed.

Similarly, in the annealing process illustrated in (c1) in FIG. 3, annealing conditions are adjusted in accordance with the diameter of the ReW filament to be processed. More specifically, the larger the diameter of the ReW filament is, at higher temperature the ReW filament is annealed, and the smaller the diameter of the ReW filament is, at lower temperature the ReW filament is annealed. To be more concrete, in the case where the diameter of the ReW filament is large, for example, the ReW filament is annealed at the temperature between 1400 and 1800 degrees Celsius in the annealing process carried out in the first drawing processing. In the final annealing process carried out in the final drawing processing in which the ReW filament is thinned down to finally have a desired diameter, the ReW filament is heated at the temperature between 1200 and 1500 degrees Celsius. Note that, in the final annealing process, electricity need not be conducted to the ReW filament.

Moreover, an annealing process may be omitted when a drawing processing is repeated. For example, a final annealing process may be omitted. More specifically, the final annealing process may be omitted and a lubricant as well as the form and hardness of a wire drawing die may be adjusted.

Finally, through the electrolytic polishing of ReW filament 14 that has desired diameter φ, the surface of ReW filament 14 is rendered smooth, as illustrated in (d) in FIG. 3. The electrolytic polishing process is carried out by conducting electricity between ReW filament 14 and counter electrode 41 such as a carbon rod, in the state where ReW filament 14 and counter electrode 41 are bathed into an electrolyte, e.g., aqueous sodium hydroxide.

With the processes as described above, saw wire 10 is manufactured as illustrated in (e) in FIG. 3.

Note that FIG. 3 schematically illustrates each process in the method of manufacturing saw wire 10. Each process may be carried out separately or in-line. For example, wire drawing dies may be aligned in a descending order of pore diameters, heating devices or the like for conducting an annealing process may be placed between the wire drawing dies, and an electrolytic polishing device or the like may be placed in a position after the wire drawing die having the smallest pore diameter.

[Effects and so On]

As has been described above, saw wire 10 according to the present exemplary embodiment is a saw wire that includes a metal wire containing rhenium-tungsten alloy. A rhenium content of the metal wire is at least 0.1 wt % and at most 10 wt % with respect to a total weight of rhenium and tungsten, an elastic modulus of the metal wire is at least 350 GPa and at most 450 GPa, a tensile strength of the metal wire is at least 3500 MPa, and a diameter of the metal wire is at most 60 μm. Moreover, the tensile strength of the metal wire is at most 5000 MPa.

Thus, since the metal wire contains tungsten as a major component, the tensile strength of the metal wire increases and thereby tolerance against breakage is improved, as the metal wire is rendered thinner. In addition, the metal wire contains rhenium, and thereby it is possible to increase the strength of the metal wire to be greater than that of pure tungsten wire. Accordingly, the metal wire has improved tolerance against breakage even after the thinning process, and therefore, it is possible to realize the tensile strength equal to or higher than that of piano wire. According to the present exemplary embodiment, it is therefore possible to provide saw wire 10 that is thinner than piano wire, and has an elastic modulus approximately twice as high as that of piano wire as well as a tensile strength equal to or higher than that of piano wire.

Saw wire 10 according to the present exemplary embodiment has a high tensile strength, and thereby saw wire 10 can be looped over guide rollers 2 with a strong tension. Therefore, the vibrations of saw wire 10 caused during the process of slicing ingot 20 can be reduced.

Thus, saw wire 10 has a small diameter and also has high tensile strength and elastic modulus, and it is therefore possible to reduce the amount of swarf produced when ingot 20 is sliced, i.e., the kerf loss of ingot 20. Accordingly, it is possible to increase the number of wafers cut out from one ingot 20.

A rhenium-tungsten alloy wire is characterized by an increase in tensile strength through thinning, therefore, the fact that saw wire 10 is composed of rhenium-tungsten alloy wire is very useful.

Moreover, cutting apparatus 1 according to the present exemplary embodiment includes saw wire 10.

With such a configuration, the diameter of saw wire 10 becomes smaller, and it is thereby possible to increase the number of wafers cut out from one ingot 20. Moreover, it is possible to reduce the amount of swarf produced when ingot 20 is sliced. This allows the effective use of limited resources such as the materials of ingot 20.

Furthermore, cutting apparatus 1 includes tension releasing device 4 that releases tension exerted on saw wire 10.

With such a configuration, it is possible to prevent strong tension from being exerted on saw wire 10, and thereby to prevent the breakage of saw wire 10, or the like.

[Variation]

Variation of the above-described exemplary embodiment will be subsequently described. The following description will focus on the difference between the variation and the above-described exemplary embodiment, and overlapping description is omitted or simplified.

The saw wire according to the present variation includes a metal wire containing potassium (K)-doped tungsten, instead of ReW alloy. The saw wire according to the present variation is quite simply a metal wire.

The saw wire contains tungsten as a major component, and a predetermined proportion of potassium. The potassium content of saw wire is at least 0.005 wt % and at most 0.010 wt % with respect to a total weight of potassium and tungsten.

The tensile strength of the metal wire containing potassium-doped tungsten (potassium-doped tungsten wire) increases as diameter φ becomes smaller. Stated differently, with the use of such potassium-doped tungsten wire, it is possible to realize a saw wire having a small diameter and a high tensile strength, and thereby to reduce the kerf loss of ingot 20.

The tensile strength, elastic modulus, diameter, etc. of the saw wire according to the present variation are respectively the same as those of saw wire 10 according to the exemplary embodiment.

As has been described above, the saw wire according to the present variation is a saw wire that includes a metal wire containing potassium-doped tungsten. A potassium content of the metal wire is at least 0.005 wt % and at most 0.010 wt % with respect to a total weight of potassium and tungsten, an elastic modulus of the metal wire is at least 350 GPa and at most 450 GPa, a tensile strength of the metal wire is at least 3500 MPa, and a diameter of the metal wire is at most 60 μm.

Thus, tungsten contains a subtle amount of potassium, and thereby crystal grain growth in the radial direction of the metal wire is restrained. Therefore, the saw wire according to the present variation increases its strength at high temperature, as compared to pure tungsten.

[Others]

Although the saw wire and cutting apparatus according to the present disclosure have been described based on the above-described exemplary embodiment and variation, the present disclosure shall not be limited to the above-described exemplary embodiments.

For example, the above-described embodiment and variation have illustrated an example of saw wire 10 being quite simply a metal wire, but is not limited to such. Saw wire 10 may include a metal wire and abrasive particles affixed to the surface of the metal wire. In other words, saw wire 10 may be a wire used in the free abrasive method as described in the exemplary embodiment, or a wire used in a fixed abrasive method. The abrasive particles are, for example, diamond, cubic boron nitride (CBN), etc.

Moreover, cutting apparatus 1 is not limited to a multi-wire saw, and may be, for example, a wire sawing apparatus that cuts out a wafer one by one by slicing ingot 20 using one wire saw 10. Furthermore, cutting apparatus 1 illustrated in FIG. 1 is a mere example, and may not include, for example, tension releasing device 4.

Forms obtained by various modifications to the exemplary embodiment that can be conceived by a person of skill in the art as well as forms realized by arbitrarily combining structural components and functions in the exemplary embodiment which are within the scope of the essence of the present disclosure are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A saw wire comprising:
   a metal wire containing rhenium-tungsten alloy, wherein:
   a rhenium content of the metal wire is at least 0.1 wt % and at most 10 wt % with respect to a total weight of rhenium and tungsten,
   an elastic modulus of the metal wire is at least 350 GPa and at most 450 GPa,
   a tensile strength of the metal wire is at least 3500 MPa, and
   a diameter of the metal wire is at most 60 μm.

2. The saw wire according to claim 1,
wherein the diameter of the metal wire is 10 μm or more.

3. The saw wire according to claim 1,
wherein the tensile strength of the metal wire is at most 5000 MPa.

4. The saw wire according to claim 1,
wherein the diameter of the metal wire is uniform.

5. A cutting apparatus comprising the saw wire according to claim 1.

6. The cutting apparatus according to claim 5, further comprising:
a tension releasing device that releases tension exerted on the saw wire.

7. A saw wire comprising:
a metal wire containing potassium-doped tungsten, wherein:
a potassium content of the metal wire is at least 0.005 wt % and at most 0.010 wt % with respect to a total weight of potassium and tungsten,
an elastic modulus of the metal wire is at least 350 GPa and at most 450 GPa,
a tensile strength of the metal wire is at least 3500 MPa, and
a diameter of the metal wire is at most 60 μm.

8. The saw wire according to claim 7,
wherein the diameter of the metal wire is 10 μm or more.

9. The saw wire according to claim 7,
wherein the tensile strength of the metal wire is at most 5000 MPa.

10. The saw wire according to claim 7,
wherein the diameter of the metal wire is uniform.

11. A cutting apparatus comprising the saw wire according to claim 7.

12. The cutting apparatus according to claim 11, further comprising:
a tension releasing device that releases tension exerted on the saw wire.

\* \* \* \* \*